Aug. 4, 1925.
C. BARCHUS
1,548,301
GAS ECONOMIZER
Filed March 12, 1924      2 Sheets-Sheet 1
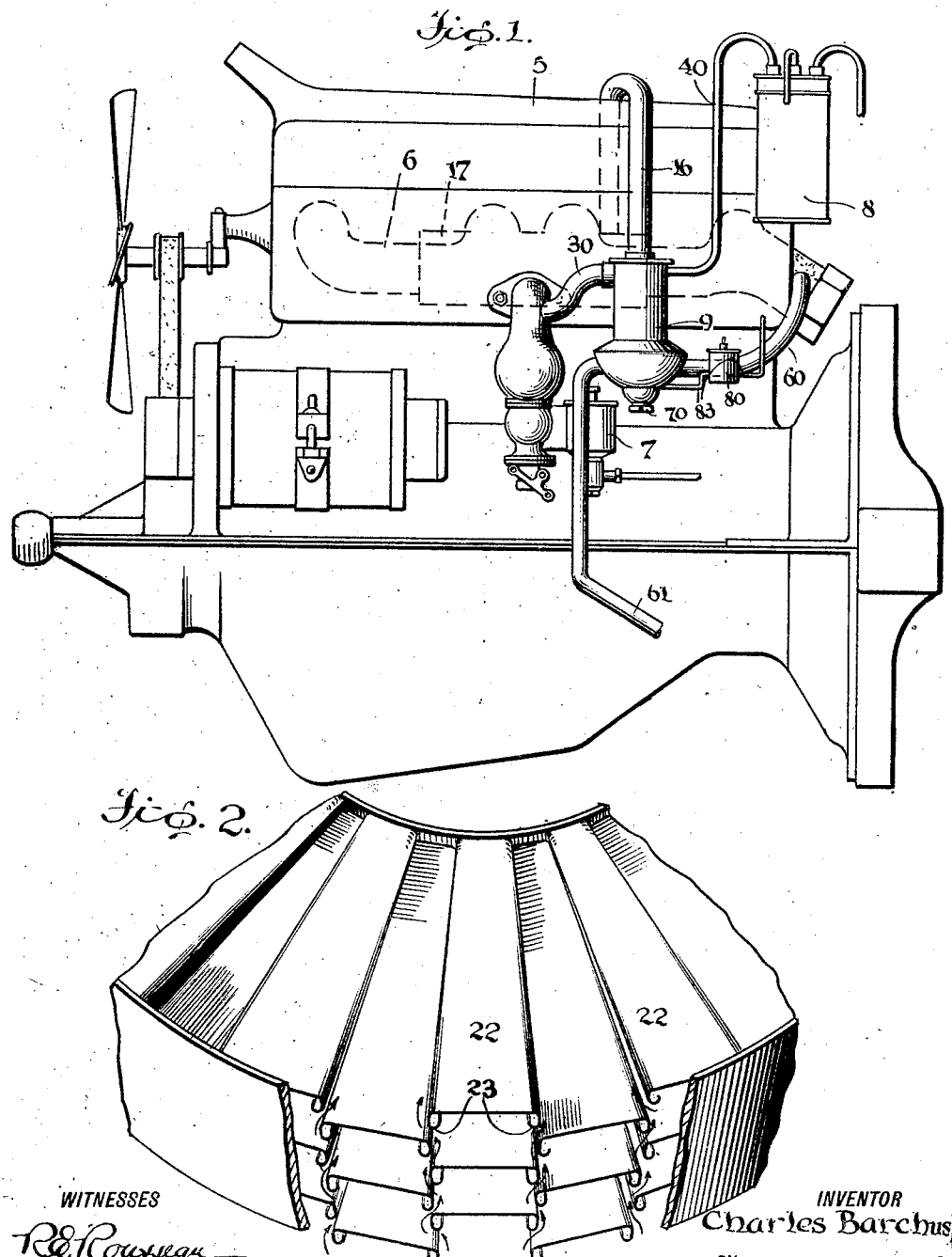

Aug. 4, 1925. 1,548,301
C. BARCHUS
GAS ECONOMIZER
Filed March 12, 1924 2 Sheets-Sheet 2
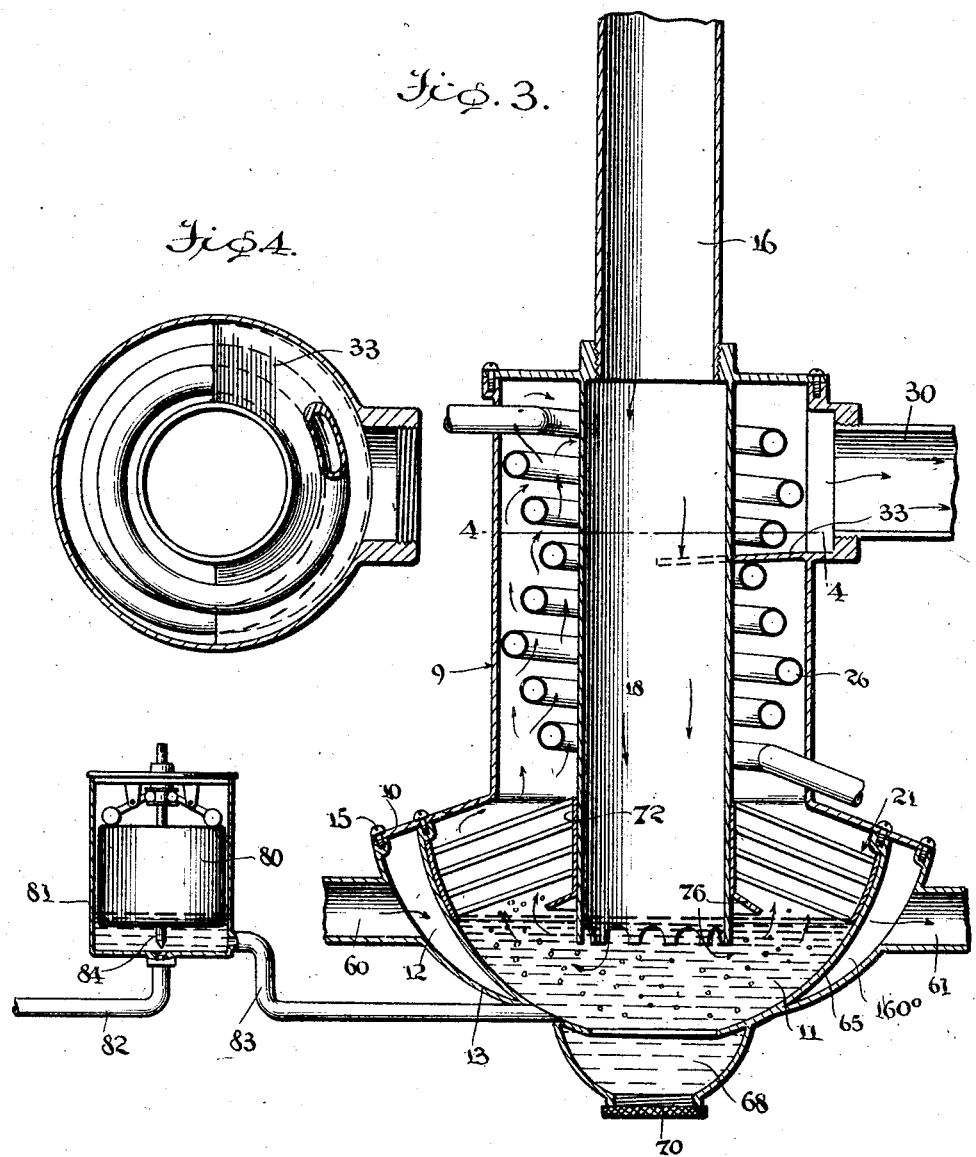
WITNESSES
R. E. Rousseau
INVENTOR
Charles Barchus,
BY
ATTORNEYS Patented Aug. 4, 1925.

1,548,301

UNITED STATES PATENT OFFICE.

CHARLES BARCHUS, OF NATCHEZ, MISSISSIPPI.

GAS ECONOMIZER.

Application filed March 12, 1924. Serial No. 698,743.

*To all whom it may concern:*

Be it known that I, CHARLES BARCHUS, a citizen of the United States, and a resident of Natchez, in the county of Adams and State of Mississippi, have invented certain new and useful Improvements in Gas Economizers, of which the following is a specification.

This invention relates to air washers and vaporizers especially adapted for use on internal combustion engines.

Briefly stated, an important object of this invention is to provide an air washer and vaporizer having simple means whereby the air is washed, heated and vaporized, prior to being supplied to the carbureter thereby insuring complete combustion of the fuel and the economical operation of the engine.

A further object is to provide an air washer and vaporizer having means in the nature of baffles to relieve air supplied to the carbureter of excessive moisture.

A further object is to provide an apparatus of the class described which is of highly simplified construction, simple to apply and cheap to manufacture.

Other objects and advantages of the invention will be apparent during the course of the following description.

In the accompanying drawing forming a part of this application, wherein like numerals are employed to designate like parts throughout the same, Figure 1 is a side elevation of the improved air washer and vaporizer applied, Figure 2 is a fragmentary perspective view of a baffle embodied in the invention, Figure 3 is a vertical sectional view thru the improved air washer and vaporizer, Figure 4 is a horizontal sectional view taken on the line 4—4 of Figure 3.

In the drawing wherein for the purpose of illustration is shown a preferred embodiment of the invention, the numeral 5 designates an internal combustion engine of any desired size and which is as illustrated in Figure 1 provided with an exhaust manifold 6, and a carbureter 7. It is understood, of course, that the carbureter is connected by means of the usual intake manifold to the several combustion chambers of the engine so as to supply the vaporized fuel thereto. A vacuum tank 8 is connected to the carbureter but in this case, the improved vaporizer is interposed between the vacuum tank and the carbureter in such a manner that the liquid fuel drawn from the vacuum tank to the carbureter will be heated on its way to the carbureter so as to assist in the formation of a proper mixture and a highly combustible fuel.

The invention forming the subject matter of this application consists of a casing 9 preferably of cylindrical formation and having its lower portion flared as indicated at 10 to provide the top wall of a water containing reservoir 11 and a heating chamber 12. As illustrated in Figure 3 the outer wall 13 of the heating chamber merges into the outer wall of the reservoir 11 and gradually diverges from the same and is secured to the annular wall 10 by means of fastening devices 15.

An air conveying pipe 16 is extended from a manifold stove 17 to the top of the casing 9 and discharges air into a centrally arranged conduit 18 in the casing, the said centrally arranged conduit terminating at a point above the bottom of the water chamber 11 and below the level of the water therein. This causes the water upon leaving the lower end of the conduit to bubble up through the water and thereby pick up a quantity of the water.

Of course, the air which is supplied to the conduit 18 by the pipe 16 is heated to approximately 160° by the exhaust gases in the manifold 6 and this air passes up through the water and contacts with an annular baffle generally designated by the numeral 21. The baffle 21 is as illustrated in Figure 2 in the nature of a truncated cone and consists of a plurality of superposed layers of strips 22 having their longitudinal edge portions flared inwardly and upwardly to define troughs 23, to receive the water. As the air passes upwardly it contacts with the annular baffle 21 and the excess water carried by the air will be removed by the strips 22. The water which contacts with the baffle 21 enters the several troughs 23 and moves to the outer end of the water reservoir 11. The air upon passing through the baffle 21 contacts with a fuel conveying coil 26 which is confined between the central conduit 18 and the casing 9. Figure 3 illustrates that the convolutions of the coil 26 are arranged in staggered relation so as to provide baffles to remove the excess water from the air. The air continues its movement through the convolutions of the coil 26 and passes out to a pipe 30 which has connection with the carbureter. A baffle plate 33 is arranged within the casing 9 beneath the pipe 30 and causes the heated air to pass about the upper portion of the conduit 18 at the side opposite the pipe 30.

Figure 1 illustrates that the vacuum tank is provided with a fuel discharge pipe 40 which extends to the coil 26 so that the liquid fuel is caused to pass downwardly through the casing and out through the lower end of the coil to the carbureter. The highly heated air contacting with the convolutions of the coil 26 will heat the liquid fuel in the convolutions to approximately 160°.

Further, the heating chamber 12 is supplied with the heated products of combustion by a pipe 60 which extends from the exhaust manifold into the chamber 12. The products of combustion circulate through the chamber 12 and out through the pipe 61 to the atmosphere. The products of combustion within the chamber 12 maintain the plate or partition 65 in highly heated condition and when the water splashes against the partition steam will be formed which will readily mix with the air.

In carrying out the invention the bottom of the water reservoir 11 is provided with a depending trap 68 having a drain plug 70 by means of which sediment may be removed when desired. It will be seen that the bottom of the reservoir 11 is formed with a centrally arranged opening less in diameter than the diameter of the upper portion of the trap 68 so that when sediment is received within the trap 68 it will remain therein and will not be subjected to the air currents passing through the water reservoir.

In operation, the heated air enters the conduit 18 by way of the pipe 16 and the air is discharged below the level of the water in the reservoir 11. The air thus discharged below the level of the water bubbles up thru the water and passes through the several baffles which incidentally are connected to a centrally arranged sleeve 72 surrounding the lower portion of the conduit. The air upon passing through the baffle 21 passes the convolutions of the coil 26 and enters the pipe 30. The air when entering the pipe 30 is highly heated and carries a quantity of moisture. The pipe 30 of course, is next to the air intake of the manifold and supplies the carbureter with the heated and water saturated air so that a very desirable mixture is obtained. An excessive quantity of water cannot be picked up by the air and carried upwardly as an annular baffle 76 connected to the lower end of the sleeve projects outwardly and relieves the air of a part of the excess moisture.

If the level of the water in the reservoir is maintained substantially constant by means of a float 80 arranged in an auxiliary casing or chamber 81 which has connection with pipes 82 and 83. A needle valve 84 may be connected to the float and coacts with a seat in forming a means to control the passage of the liquid. However, any other desirable means may be employed for maintaining a constant level of liquid in the reservoir.

It is to be understood that the form of the invention herewith shown and described is to be taken as a preferred example of the same, and that such minor changes in arrangement and construction of parts may be made as will remain within the spirit of the invention and the scope of the appended claims.

Having thus described the invention, what is claimed is:—

1. An apparatus of the class described, comprising a casing having a conduit adapted for the passage of heated air, the lower portion of the casing being formed with a water containing reservoir, the level of the water being above the outlet end of said conduit, and a fuel containing coil surrounding the conduit and having a plurality of staggered convolutions constituting baffles arranged in the path of travel of the air.

2. An apparatus of the class described, comprising a casing having a conduit adapted for the passage of heated air, the lower portion of the casing being formed with a water containing reservoir, a fuel containing coil surrounding the conduit and having a plurality of staggered convolutions constituting baffles arranged in the path of travel of the air, and an outlet pipe connected to the upper portion of the casing.

3. An apparatus of the class described, comprising a casing having a conduit adapted for the passage of heated air, the lower portion of the casing being formed with a water containing reservoir, the level of the water being above the outlet end of said conduit, a fuel containing coil surrounding the conduit and having a plurality of staggered convolutions constituting baffles arranged in the path of travel of the air, an outlet pipe connected to the upper portion of the casing, and an air baffle plate arranged at the inlet end of said outlet pipe.

4. An apparatus of the class described, comprising a casing having a conduit adapted for the passage of heated air, the lower portion of the casing being formed with a water containing reservoir, a baffle surrounding the conduit and arranged in the path of travel of the water saturated air, a fuel containing coil surrounding the conduit and having a plurality of staggered convolutions constituting baffles arranged in the path of travel of the air, an outlet pipe connected to the upper portion of the casing, and a heating chamber surrounding said reservoir and projecting a substantial distance above the same.

5. An apparatus of the class described, comprising a casing having a conduit adapted for the passage of heated air, the lower portion of the casing being formed with a water containing reservoir, the level of the water being above the outlet end of said conduit, a baffle surrounding the conduit and arranged in the path of travel of the water saturated air, a fuel containing coil surrounding the conduit and having a plurality of staggered convolutions constituting baffles arranged in the path of travel of the air, an outlet pipe connected to the upper portion of the casing, an air baffle plate arranged at the inlet end of said outlet pipe, a heating chamber surrounding said reservoir and means whereby to connect the heating chamber to the exhaust manifold of an internal combustion engine.

6. An apparatus of the class described, comprising a casing having a centrally arranged conduit adapted for the passage of heated air, the lower portion of the casing being formed with a water containing reservoir having a sediment trap therein, a baffle surrounding the conduit and arranged in the path of travel of the water saturated air, a fuel containing coil surrounding the conduit and having a plurality of staggered convolutions constituting baffles arranged in the path of travel of the air, an outlet pipe connected to the upper portion of the casing, an air baffle plate arranged at the inlet end of said outlet pipe, a heating chamber surrounding said reservoir and means whereby to connect the heating chamber to the exhaust manifold of an internal combustion engine.

7. An apparatus of the class described, comprising a casing having a centrally arranged conduit adapted for the passage of heated air, the lower portion of the casing being formed with a water containing reservoir, a baffle surrounding the conduit and arranged in the path of travel of the water saturated air, a fuel containing coil within the casing and having a plurality of staggered convolutions constituting baffles arranged in the path of travel of the air, an outlet pipe connected to the upper portion of the casing, an air baffle plate arranged at the inlet end of said outlet pipe, a heating chamber surrounding said reservoir and projecting a substantial distance above the same, means whereby to connect the heating chamber to the exhaust manifold of an internal combustion engine, and means to maintain a constant water level in said reservoir.

CHARLES BARCHUS.